United States Patent
Goleczka et al.

(10) Patent No.: US 10,215,327 B2
(45) Date of Patent: Feb. 26, 2019

(54) MOUNTING CHASSIS FOR GENSET WITH REDUCED CLEARANCE

(71) Applicant: Cummins Power Generation Limited, Manston, Ramsgate, Kent (GB)

(72) Inventors: Peter Goleczka, Minnetonka, MN (US); Tejaskumar Amin, Ramsgate (GB); Kent A. Lobsiger, Nashville, IN (US); Ramesh Timande, Columbus, IN (US)

(73) Assignee: Cummins Power Generation Limited, Ramsgate (GB)

( * ) Notice: Subject to any disclaimer, the term of this patent is extended or adjusted under 35 U.S.C. 154(b) by 3 days.

(21) Appl. No.: 15/058,979

(22) Filed: Mar. 2, 2016

(65) Prior Publication Data
US 2017/0254468 A1 Sep. 7, 2017

(51) Int. Cl.
*F16M 1/00* (2006.01)
*F16M 5/00* (2006.01)
(Continued)

(52) U.S. Cl.
CPC ............... *F16M 1/00* (2013.01); *F02B 63/04* (2013.01); *F16M 3/00* (2013.01); *F16M 5/00* (2013.01); *F16M 7/00* (2013.01); *F16M 9/00* (2013.01)

(58) Field of Classification Search
CPC .. F16M 1/00; F16M 3/00; F16M 5/00; F16M 7/00; F16M 9/00; F02B 63/04;
(Continued)

(56) References Cited

U.S. PATENT DOCUMENTS 3,851,607 A * 12/1974 August, Jr. ............ B63H 21/30
248/678
4,174,482 A 11/1979 Bollman
(Continued)

FOREIGN PATENT DOCUMENTS

EP 0 278 931 8/1988
EP 0 931 918 A2 12/1998
(Continued)

OTHER PUBLICATIONS

International Search Report and Written Opinion for International Application No. PCT/IB2017/051210, dated Jun. 6, 2017, 13 pages.

*Primary Examiner* — Nkeisha Smith
(74) *Attorney, Agent, or Firm* — Foley & Lardner LLP

(57) ABSTRACT

A genset chassis for mounting a genset includes an engine and generator thereon includes a pair of inner beams and an outer beam coupled to an outer sidewall of a corresponding inner beam. The outer beams are vertically offset from the corresponding inner beam such that at least a portion of the outer beams is higher than a corresponding inner beam. The outer beams are structured to be positioned on mounting members positioned on a surface so that a first distance between the at least a pair of inner beams and the surface is less than a second distance between the plurality of outer beams and the surface. The inner beams are structured to mount at least a portion of the genset thereon such that a part of the at least a portion of the genset is lower than the plurality of outer beams.

26 Claims, 11 Drawing Sheets

(51) Int. Cl.
*F16M 7/00* (2006.01)
*F16M 9/00* (2006.01)
*F02B 63/04* (2006.01)
*F16M 3/00* (2006.01)

(58) Field of Classification Search
CPC .......... F02B 63/042; F02B 63/044; F02B 2063/045; F16B 39/24; H02K 7/1815; F16H 57/025; F16H 7/28
USPC .......... 248/639, 637, 678, 672, 676, 677
See application file for complete search history.

(56) References Cited

U.S. PATENT DOCUMENTS

| | | | |
|---|---|---|---|
| 4,501,973 A | | 2/1985 | Fenemore et al. |
| 5,085,396 A | | 2/1992 | Mansson |
| 5,273,130 A | | 12/1993 | Nemeth |
| 5,324,073 A | * | 6/1994 | Alatalo ............... B60G 21/051 228/144 |
| 7,121,586 B2 | | 10/2006 | McNally |
| 7,552,903 B2 | | 6/2009 | Dunn et al. |
| 8,857,781 B2 | | 10/2014 | Wang et al. |
| 9,593,799 B2 | * | 3/2017 | Wang ...................... F16F 15/04 |
| 2005/0218288 A1 | | 10/2005 | Allen et al. |
| 2013/0106113 A1 | * | 5/2013 | Wang ...................... F16M 7/00 290/1 A |

FOREIGN PATENT DOCUMENTS

| | | |
|---|---|---|
| WO | WO-98/50727 A1 | 11/1998 |
| WO | WO-2009/147287 A1 | 12/2009 |

* cited by examiner

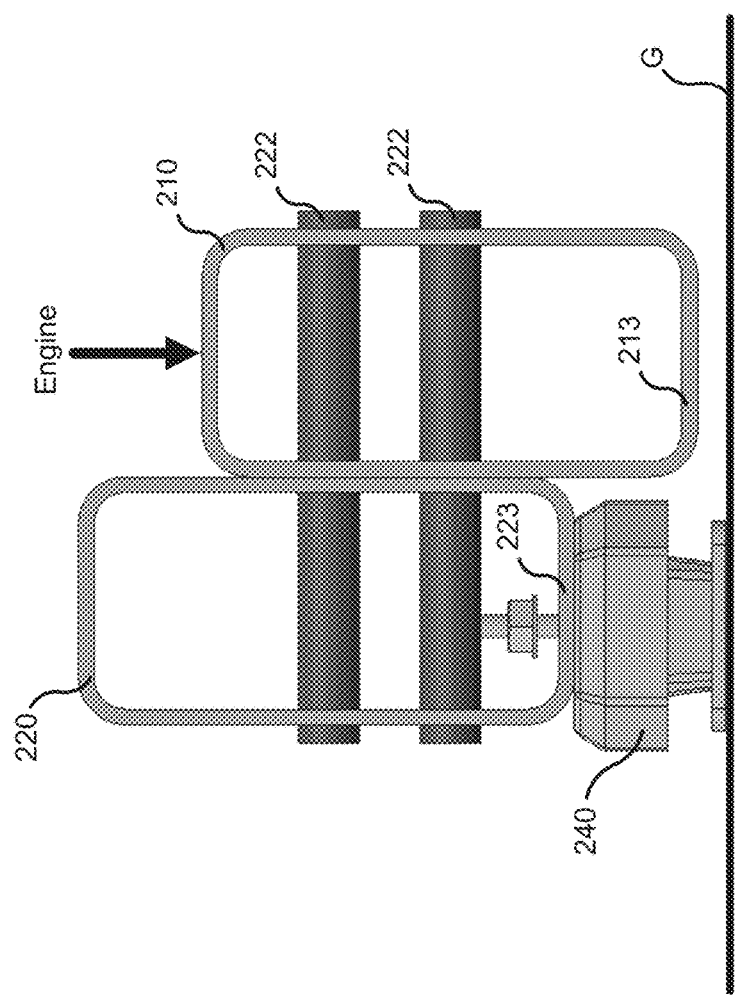

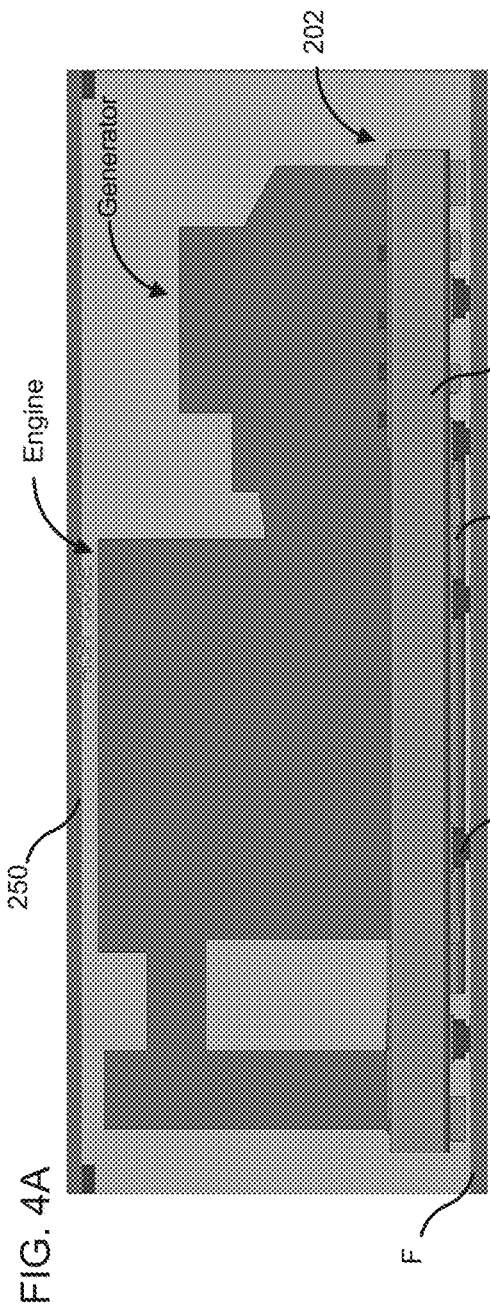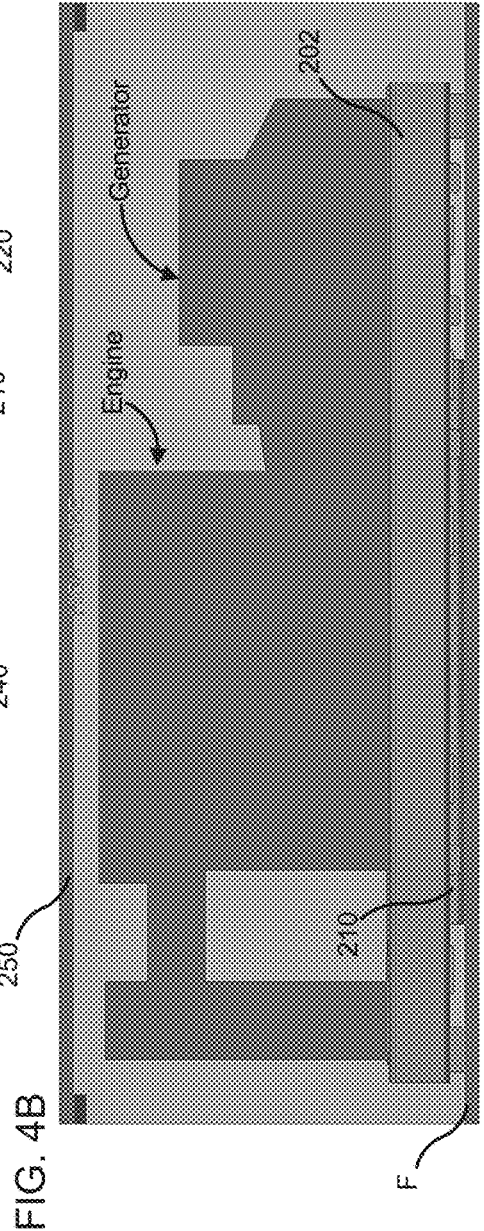

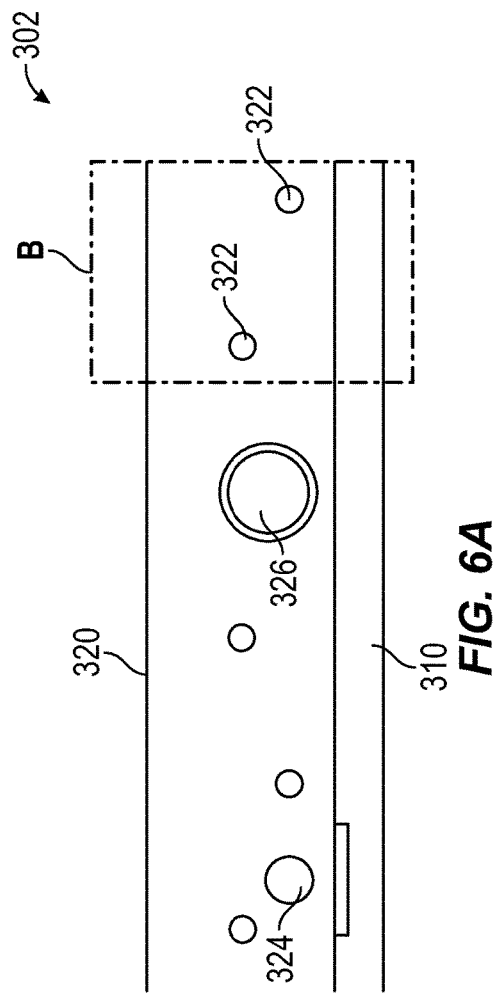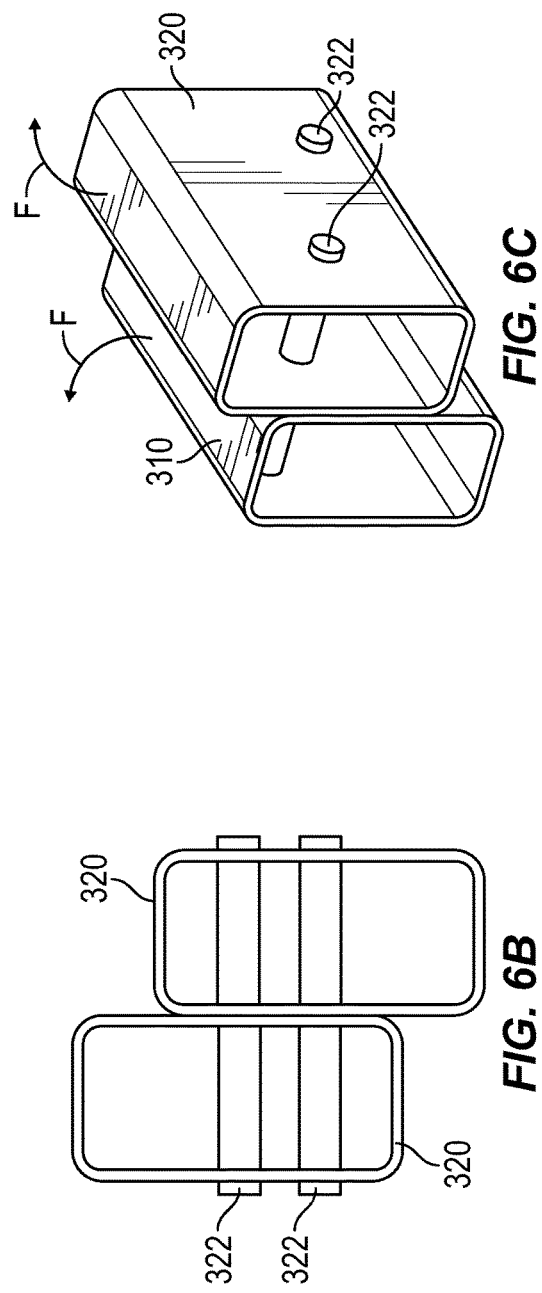

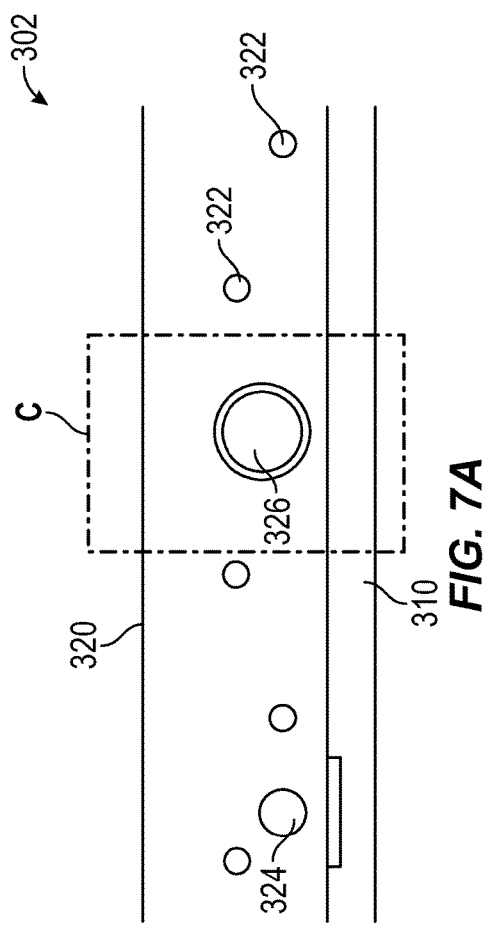
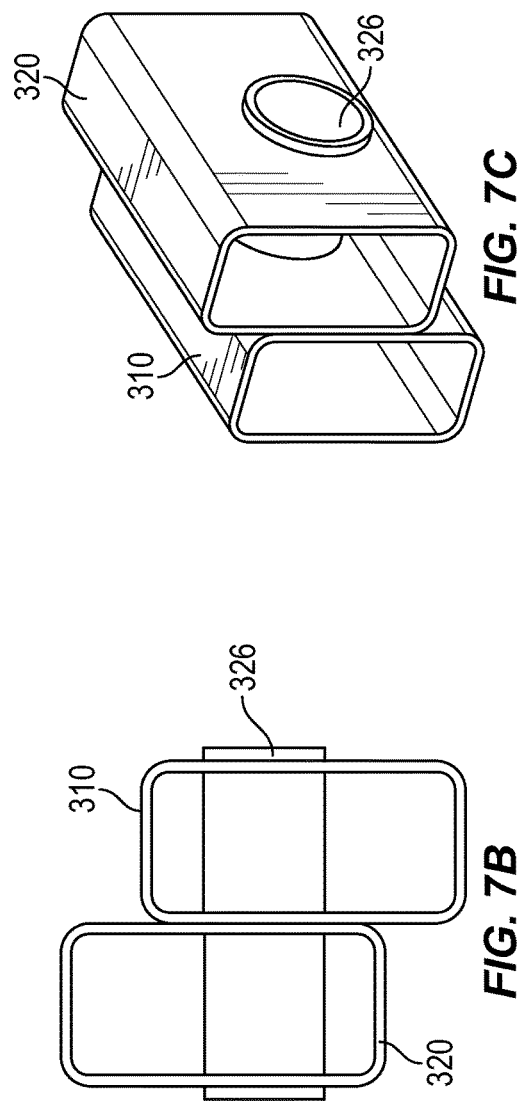

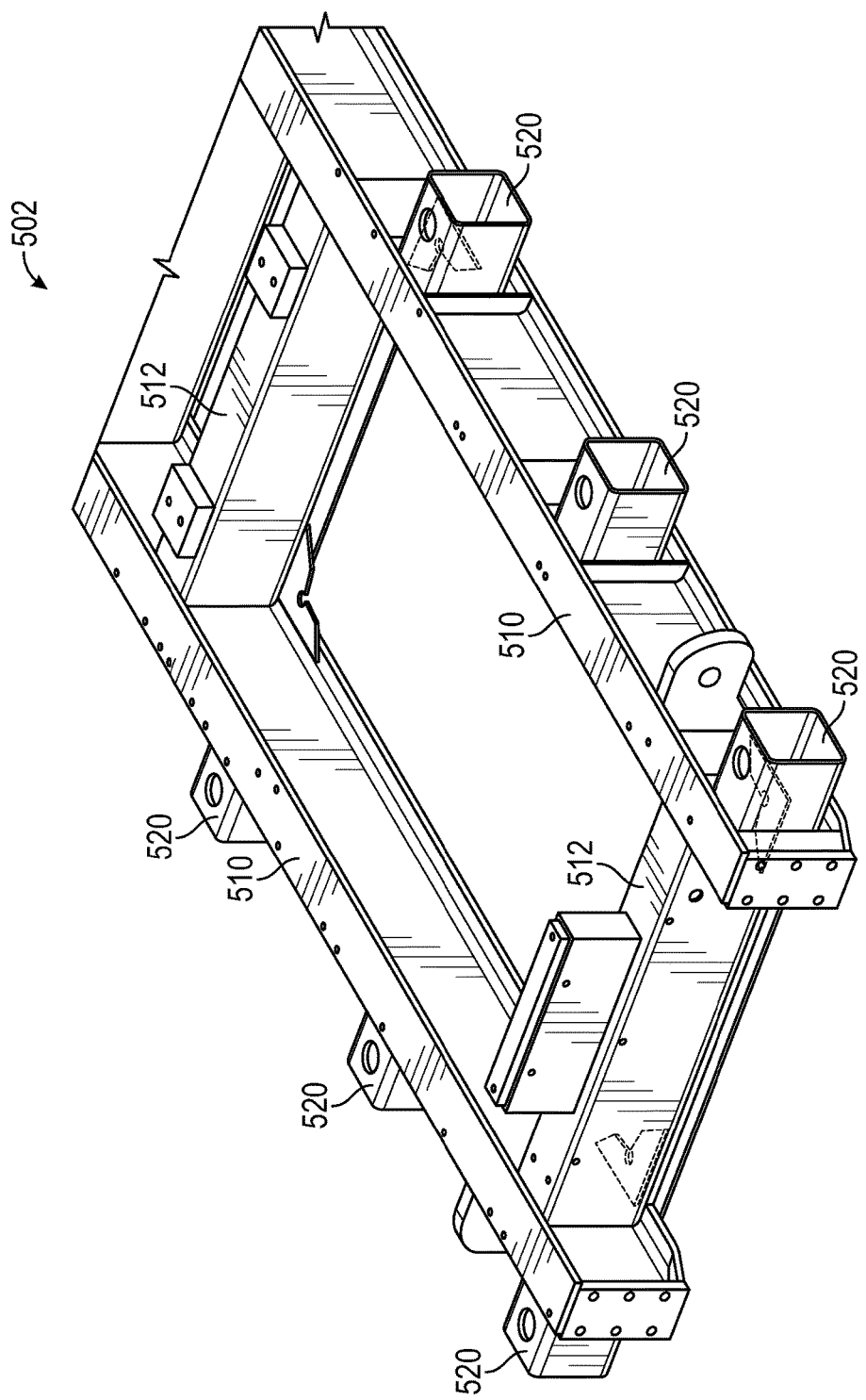

MOUNTING CHASSIS FOR GENSET WITH REDUCED CLEARANCE

TECHNICAL FIELD

The present disclosure relates generally to chassis or skid frames for mounting generator sets (gensets).

BACKGROUND

Large commercial generator sets (gensets) are used extensively for physical power production (such as pumps or other shaft power outputs) and power generation and are deployed at a desired deployment site to meet power requirements at the site. Gensets may be positioned within and shipped to the deployment site in enclosures, for example shipping containers. Gensets may be placed within an enclosure at the deployment site, for example within a container, a brick and mortar facility or any other enclosure. Gensets generally include an engine and a generator mounted on a skid frame or a chassis. The genset is generally secured to the chassis or otherwise skid frame and positioned thereon in the enclosure.

SUMMARY

Embodiments described herein relate generally to systems and methods for reducing the overall height of gensets so as to reduce the space occupied by the genset within enclosures. In particular, some embodiments of a chassis or skid frame for mounting a genset thereon includes outer tubes vertically offset from inner tubes on which a portion of the genset is positioned such that an overall height of the genset is reduced.

In some embodiments, a genset chassis for mounting a genset including an engine and generator thereon includes at least a pair of inner beams and a plurality of outer beams. The at least a pair of inner beams are positioned parallel to each other and spaced apart by a distance. An outer beam of each of the plurality of outer beams is coupled to an outer sidewall of a corresponding inner beam of the at least a pair of inner beams. The outer sidewall is distal from a longitudinal axis of the genset chassis. The plurality of outer beams are vertically offset from the corresponding inner beam such that at least a portion of the plurality of outer beams is higher than a corresponding portion of the at least a pair of inner beams. The outer beams are structured to be positioned on a plurality of mounting members positioned on a surface so that a first distance between the at least a pair of inner beams and the surface is less than a second distance between the plurality of outer beams and the surface. Furthermore, the at least a pair of inner beams are structured to mount at least a portion of the genset thereon such that a part of the at least a portion of the genset is lower than the at least a portion of the plurality of outer beams.

In some embodiments, a genset mounting assembly for mounting a genset including an engine and a generator includes a genset chassis. The genset chassis includes at least a pair of inner beams positioned parallel to each other and spaced apart by a distance, and a plurality of outer beams. An outer beam of each of the plurality of outer beams is coupled to an outer sidewall of a corresponding inner beam of the at least a pair of inner beams, the outer sidewall is distal from a longitudinal axis of the genset chassis. The plurality of outer beams are vertically offset from the corresponding inner beam such that at least a portion of the plurality of outer beams is higher than a corresponding portion of the at least a pair of inner beams. The genset mounting assembly also includes a plurality of mounting members structured to be positioned on a surface. The outer beams are positioned on the plurality of mounting members so that a first distance between the at least a pair of inner beams and the surface is less than a second distance between the plurality of outer beams and the surface. Moreover, the inner beams are structured to mount at least a portion of the genset thereon such that a part of the at least a portion of the genset is lower than at least a portion of the plurality of outer beams.

In some embodiments, a method of mounting a genset, which includes an engine and a generator, on a surface includes providing a chassis including at least a pair of inner beams positioned parallel to each other and spaced apart by a distance. The chassis also includes a plurality of outer beams. An outer beam of each of the plurality of outer beams is coupled to an outer sidewall of a corresponding inner beam of the at least a pair of inner beams. The outer sidewall is distal from a longitudinal axis of the genset chassis. The plurality of outer beams are vertically offset from the corresponding inner beam such that at least a portion of the plurality of outer beams is higher than a corresponding portion of the at least a pair of inner beams. The chassis is positioned on a plurality of mounting members positioned on a surface such that the plurality of outer beams are positioned on the mounting members. The engine is positioned on the at least a pair of inner beams such that a part of the engine is lower than the at least a portion of the plurality of outer beams. The generator is positioned on the at least a pair of inner beams or the plurality of outer beams. A first distance between the at least a pair of inner beams and the surface is less than a second distance between the plurality of outer beams and the surface.

In some embodiments, a genset assembly includes an engine, a generator and a genset chassis. The genset chassis includes at least a pair of inner beams positioned parallel to each other and spaced apart by a distance, and a plurality of outer beams. An outer beam of each of the plurality of outer beams is coupled to an outer sidewall of a corresponding inner beam of the at least a pair of inner beams so that the outer sidewall is distal from a longitudinal axis of the genset chassis. The plurality of outer beams are vertically offset from the corresponding inner beam such that at least a portion of the plurality of outer beams is higher than a corresponding portion of the at least a pair of inner beams. The genset mounting assembly also includes a plurality of mounting members structured to be positioned on a surface. The outer beams are positioned on the plurality of mounting members so that a first distance between the at least a pair of inner beams and the surface is less than a second distance between the plurality of outer beams and the surface. The engine is mounted on the inner beams such that a part of the at least a portion of the engine is lower than at least a portion of the plurality of outer beams. Moreover, the generator is mounted on at least one of the inner beams or the outer beams.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 3 is a front view of a portion of the chassis of FIG. 2 showing an outer beam vertically offset and positioned higher than an inner beam, and positioned on mounting members.

FIG. 4A is a side-cross section view of an enclosure defining an internal volume within which a genset positioned on the chassis of FIG. 2 is positioned with the outer member of the chassis mounted on mounting members; FIG. 4B is a side cross-section view of the enclosure of FIG. 4A with the inner members of the chassis of FIG. 4A positioned on a floor of the enclosure so that the mounting members are excluded.

FIGS. 6A-C show side, front and perspective views, respectively of a portion of the chassis of FIG. 5 which includes a plurality of pins positioned through the inner beam and the outer beam of the chassis of FIG. 5.

FIGS. 7A-C show side, front and perspective views, respectively of a portion of the chassis of FIG. 5 which includes a sleeve positioned through the inner beam and the outer beam of the chassis of FIG. 5.

FIG. 9 is a perspective view of another embodiment of a chassis for mounting a genset.

Figure 1A:
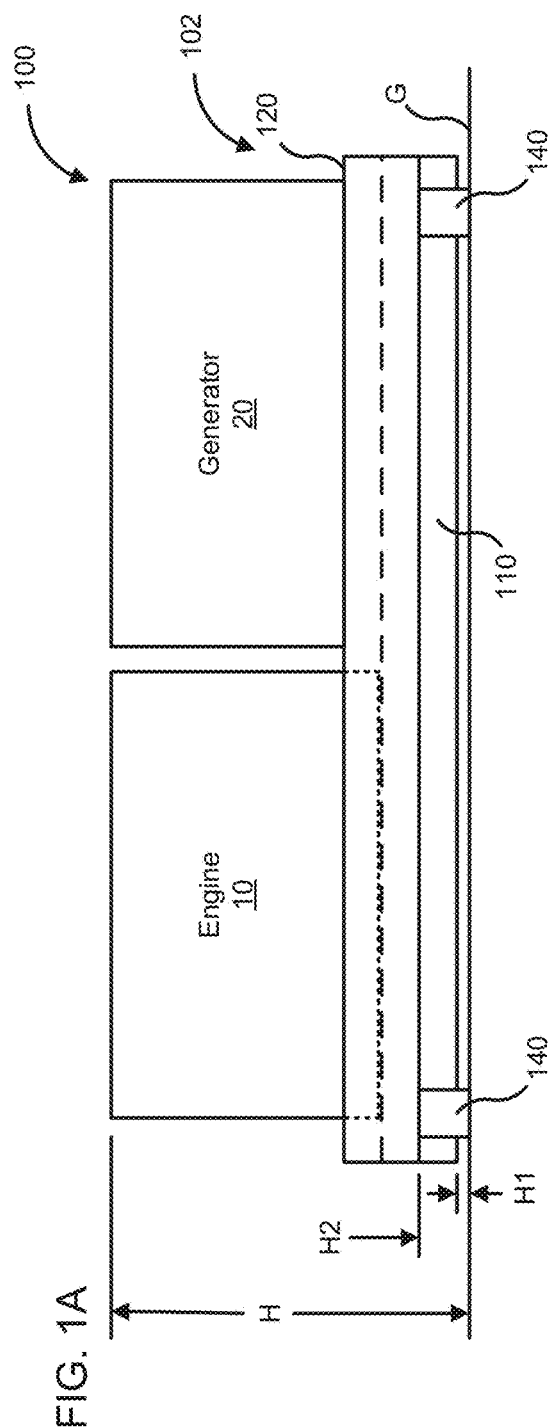
FIG. 1A is a schematic illustration of a side view of a genset assembly including an engine and a generator mounted a chassis.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for mounting generator sets, for example, to reduce the overall height of gensets so as to reduce the space occupied by the genset within enclosures. In particular, some embodiments of a chassis or skid frame for mounting a genset thereon includes outer tubes vertically offset from inner tubes on which a portion of the genset is positioned such that an overall height of the genset is reduced.

Large high horse power commercial internal combustion engines and gensets, for example gensets rated at greater than 750 kW, are used extensively for physical power production (such as pumps or other shaft power outputs) and power generation and are deployed at a desired deployment site to meet power requirements at the site. Gensets are often shipped to the deployment site in shipping containers or enclosures. The standard shipping containers used by the shipping industry generally follow the International Organization for Standardization (ISO) 6346 standard. Such standard ISO containers generally have a length of about 12.2 meters, a width of about 2.4 meters, and various height allowances. The genset may also be positioned within an enclosure, for example a container (e.g., an ISO 6346 container) or a brick or mortar facility at a site where the genset is deployed.

Genset assemblies generally include a chassis or otherwise a skid frame on which the genset (e.g., an engine and generator) are mounted. The chassis is positioned on a surface within the enclosure, for example a floor or base of an enclosure. The total height of the genset from the surface of the enclosure includes the height of a portion of the chassis on which the engine and/or generator are generally mounted. The chassis height has generally been a constant and the total height of the genset assembly is determined by the height of the engine or the generator positioned (e.g., the taller of the two). Generally, a limited space is available inside the enclosure once the genset mounted on the chassis is positioned within the container.

Various genset assemblies including an engine and/or generator mounted on a chassis or otherwise skid frame can have an overall height which can exceed a height of the enclosure within which the genset assembly is to be positioned. To accommodate such genset assemblies, non-standard containers may be used or modifications made to the enclosure, which can add significantly to the overall shipping or housing cost. Even if the generator assembly has a height which falls just within the height of the standard enclosure, there may not be sufficient space to access the genset, for example for disposing accessories or performing maintenance operations on the genset assembly.

Embodiments of the vertically offset chassis for mounting larger gensets (e.g., rated at greater than 750 kW) or large engines may provide benefits including, for example: (1) lowering of the overall height of the genset assembly and, thereby, lowering the center of gravity and stability of the genset; (2) using smaller outer beams and inner beam (e.g., tubes) coupled together to provide enhanced stiffness which would normally be achievable only with much larger beams; (3) providing greater ceiling clearance when the genset is positioned in an enclosure, for example an ISO container or a brick and mortar facility, thereby providing improved service access; (4) allowing mounting of the generator vertically offset from the engine so that a base of the generator is higher than a base of the engine, (5) decreasing the length of a moment arm formed by the operative coupling of the engine and/or the generator to the skid frame and each other and increasing stiffness; (6) allowing use of hollow tubes for the outer and inner beams which can additionally be used to store oil (e.g., engine or generator oil) or communicate air to selected portions of the genset to provide cooling; (7) allowing use the same gage or thickness beams and only varying the length for mounting engines, generators and/or gensets of any size while meeting mechanical strength and stiffness needs; and (8) allowing use of structural adhesives for coupling outer beams to the inner beams which may provide beneficial damping characteristics for resonant frequencies.

Figure 1B:
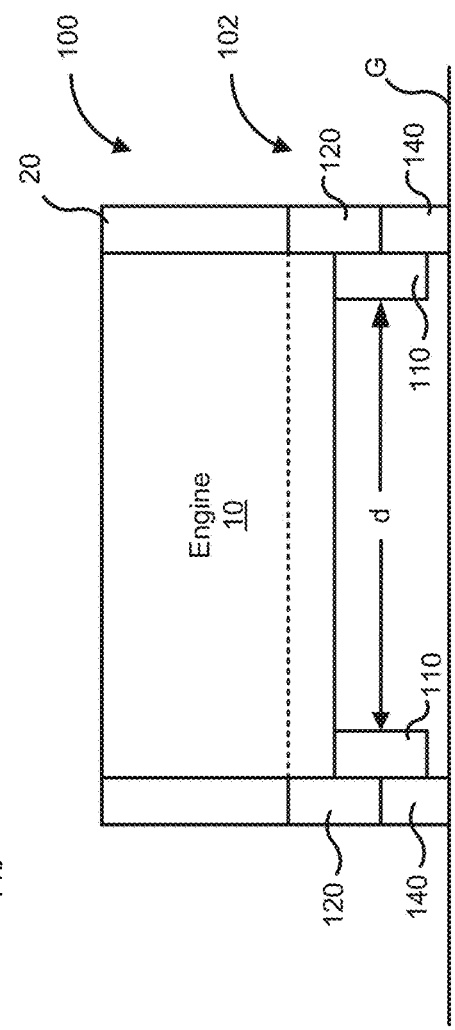
FIG. 1B is a front view thereof.

FIGS. 1A and 1B are schematic illustrations of a side view and front view, respectively of a genset assembly 100 according to an embodiment. The genset assembly 100 includes an engine 10, a generator 20 and a chassis 102 or otherwise skid frame on which the engine 10 and generator 20 are mounted. The genset assembly 100 can be large genset, for example having a power rating of greater than 750 kW.

The genset 100 may be a back-up power source in the event of a loss of electrical grid power. In one embodiment, the genset 100 may serve as the primary power source when grid electricity is not being used or when grid electricity fails. In some embodiments, the genset 100 may be provided as a secondary source of power for homes or businesses. In some embodiments, the genset 100 may be the primary source of power where grid power is not readily available, such as remote locations or construction sites. The genset 100 can also be used as a primary power source for marine vessels, railway engines, construction equipment, or any other application where mechanical and/or electrical power is desired. The genset 100 may be included as a backup or short term operation reserve (STOR) power source for supplying power to a load or utility grid.

The engine 10 can include an IC engine (e.g., a lean burn natural gas engine, a diesel engine, a dual fuel engine, etc.) which converts fuel (e.g., diesel, gasoline, ethanol, etc.) into mechanical energy. Combustion of fuel by the engine 10 produces an exhaust gas (e.g., a diesel exhaust gas) that can include NOx gases, carbon monoxide, and/or other harmful pollutants which should be reduced or otherwise treated before expelling into the environment. In some embodiments, the engine 10 can have a length in the range of 3 meters to 5 meters, a width in the range of 1.8 meters to 2.2 meters and a height in the range of 2 meters to 2.4 meters, inclusive of all ranges and values therebetween.

The generator 20 can include a wound rotor or permanent magnet alternator configured to convert a rotational mechanical power produced by the engine 10 into electrical energy. In some embodiments, the generator 20 can be mechanically coupled to the engine 10 by a mechanical linkage that can provide a desired turn ratio, a torque converter, a transmission, any other form of rotary linking mechanism, or a combination thereof. In some embodiments, an inverter can also be electrically coupled to the generator 20. In various embodiments, the engine 10 may be taller than the generator 20. The generator 20 can have any suitable dimensions for operative coupling to the engine 10. For example, the generator can have a length in the range of 2 meters to 3 meters (e.g., 2.5 meters), a width in the range of 1.2 meters to 1.6 meters (e.g., 1.4 meters) and a height in the range of 1.3 meters to 1.7 meters (e.g., 1.5 meters) inclusive of all ranges and values therebetween.

The generator 20 is configured to produce an electrical output. The electrical output can include a voltage and/or a current, and is representative of a load on the engine 10. For example, the electrical output can correspond to the engine 10 power (e.g., power=voltage×current). In particular embodiments, the electrical output from the generator 20 can be converted or inverted to transform the electrical output from a direct current (DC) to an alternating current (AC). In some embodiments, the generator 20 may be configured to generate an AC current.

The engine 10 and the generator 20 are positioned on the chassis 102. The chassis 102 includes at least a pair of inner beams 110 positioned parallel to each other and spaced apart by a distance d. In some embodiments, the distance d between the pair of inner beams 110 can correspond to a width of at least a portion of the engine 10 and/or the generator 20 which may be positioned on the inner beams 110, as described herein. In various embodiments, a plurality of inner beams 110 can be used. For example, the plurality of inner beams 110 can include multiple beams positioned end to end to correspond to a length of the engine 10, the generator 20 and/or the genset assembly 100. The inner beams 110 can have any suitable shape or size. For example, the inner beams 110 can include tubes (e.g., circular or square tubes), I-beams, or solid rectangular beams.

In some embodiments, the pair of inner beams 110 can be coupled to each other via one or more cross-members (not shown). The cross-members can span the distance d and can include any suitable cross-members. For example, the cross-members can include structural beams similar to the inner beams 110 (e.g., rectangular or circular tubes). The cross-members can extend orthogonally between the pair of inner beams 110, for example oriented perpendicular (i.e., at an angle of 90 degrees) to each of the pair of inner beams 110, or oriented at any other suitable angle, for example at an angle in the range of 30 degrees to 60 degrees with respect to each of the inner beams 110 (e.g., an angle of 30, 35, 40, 45, 50, 55 or 60 degrees inclusive of all ranges and values therebetween). In some embodiments, platforms or other structures for mounting the engine 10 and/or the generator 20, oil reservoirs, oil drip pans or any other accessories for the genset 100 can be positioned in the space between the inner beams 110.

The chassis 102 also includes a plurality of outer beams 120, for example a pair of outer beams 120. An outer beam 120 of each of the plurality of outer beams 120 is coupled to an outer sidewall of a corresponding inner beam 110, the outer sidewall being distal from a longitudinal axis of the chassis 102. In this manner, the outer beams 120 are positioned distal from the longitudinal axis of the chassis 102 relative to the corresponding inner beam 110. The plurality of outer beams 120 are vertically offset from the corresponding inner beam 110 such that at least a portion of the plurality if outer beams 120 is higher than a corresponding portion of the at least a pair of inner beams 110.

For example, the inner beams 110 and the outer beams 120 can include hollow tubes, for example rectangular or square hollow tubes. In particular embodiments, the outer beams 120 and the inner beams 110 can include 12, 14, 16, 18 or 20 inch high tubes inclusive of all ranges and values therebetween or have any other suitable height. Each of the plurality of outer beams 120 may be positioned parallel to the corresponding inner beams 110 along at least a portion of the length of the corresponding inner beam 110 so that the outer beam 120 abuts the corresponding inner beam 110. In some embodiments, the plurality of outer beams 120 can be longer than the corresponding inner beam 120. In some embodiments, the outer beams 120 can be shorter or equal in length to the corresponding inner beam 110.

Furthermore, the outer beam 120 is positioned vertically offset from the inner beam 110 as shown in FIGS. 1A and 1B. For example, a first sidewall of an outer beam 120 of the plurality of outer beams 120 proximal to a surface G (e.g., ground, base of an enclosure such as a container or floor of a brick and mortar facility) on which the genset assembly 100 is positioned, is located higher than a second sidewall of the corresponding inner beam 110 relative to the surface G when the outer beam 120 is positioned parallel to an abutting the inner beam 110. For example, the first sidewall of the outer beam 120 can be positioned adjacent to a center of the corresponding inner beam 110. Furthermore, the outer beam 120 can have an outer beam height which is the same as or larger than an inner beam height of the corresponding inner beam 110 so that the outer beam 120 is vertically offset from the inner beam 110 and at least a portion of the outer beam 120 is higher than the corresponding portion of the corresponding inner beam 110. In various embodiments, the vertical offset between the outer beams 120 and the inner beams 110 can be 2, 4, 6, 8 or 10 inches inclusive of all ranges and values therebetween or have any other suitable offset.

Vertically offsetting the outer beams 120 relative to the inner beams 110 can increase the bending stiffness of the structure so that the combination of the outer beam 120 and the inner beam 110 has a stiffness greater than when they are placed side-by-side. For example, each of the outer beams 120 and the inner beams 110 can include 16 inch tall beams which are coupled together and offset by a distance of 4 inches to provide an increase in the area moment of inertia by an additional amount of cross sectional area multiplied by the square of half the offset distance.

The outer beams 120 and inner beams 110 including the square or hollow tubes described herein can be coupled together using any suitable means. For example, the outer beam 120 can be coupled to the corresponding inner beam 110 using welds and/or a structural adhesive. The structural adhesive for bonding the outer beam 120 to a corresponding inner beam 110 can include polyurethanes, toughened acrylics, cyanoacrylates, epoxies, anaerobics, phenolics, vinyl acetates or any other suitable structural adhesives. The structural adhesives can provide load bearing capability and/or changing and/or tuning the natural frequency of the chassis 102, thereby providing damping of resonant frequencies.

In various embodiments, a plurality of pins (not shown) can be positioned through the plurality of outer beams 120 and the corresponding inner beam 110. The pins can be structured to resist shear and prevent uncoupling of the outer beams 120 from the corresponding inner beam 110. In some embodiments, a plurality of sleeves (not shown) can also be positioned through the plurality of outer beams 120 and the corresponding inner beam 110. The plurality of sleeves can include hollow members (e.g., circular tubes) structured to allow passage of a genset component therethrough, for example, tubes (e.g., oil pipes, water or coolant tubes), electrical leads or wires, etc.

In some embodiments, at least one cross-beam (not shown) can also be positioned through the plurality of outer beams 120 and the corresponding inner beam 110, for example to couple the outer beam 120 to the corresponding inner beam 110 and/or provide additional structural support. The plurality of pins, the plurality of sleeves and/or the cross-beams may resist torque, for example generated by rotation of a crankshaft of the engine 10, and resist cleavage or peeling of the plurality of outer beams 120 from the corresponding inner beams 110 if structural adhesive if used to bond them together, as described herein.

The hollow outer tubes 120 and/or the inner tubes 110 can be used for storage purposes or passage of a fluid therethrough. For example, the hollow outer tubes 120 and/or the inner tubes 110 can be structured to store oil (e.g., engine oil, generator oil, gear oil, etc.) in an inner volume defined therewithin for communicating to the engine 10 and/or the generator 20. The inner volume of the outer tubes 120 and/or the inner tubes 110 can, for example serve as a secondary reservoir for the oil to provide to a primary reservoir of the oil as needed, or serve as a primary or secondary reservoir of an engine 10 coolant. Furthermore, the outer tubes 120 and/or the inner tubes 110 may also be used as oil coolers as the outer tubes 120 an the inner tubes 110 provide a large surface area for cooling the oil or any other fluid flowing therethrough or contained therewithin.

In some embodiments, the inner beams 110 and/or the outer beams 120 are structured to allow air to flow through the inner volume. For example, the outer tubes 120 and/or the inner tubes 110 may be fluidly coupled to fixed or variable speed fans (e.g., fans or air intake or exhaust) to receive air therefrom. One or more pipes (not shown) can be fluidly coupled to the inner volume defined by at least one of the inner beams 110 and/or the outer beams 120. The one or more pipes may be structured to direct the air flowing through the inner beams 110 and/or the plurality of outer beams 120 towards the genset 100 or be coupled to local ducting to provide or concentrate airflow on a specific part or area, thereby cooling at least a portion of the genset 100 (e.g., a radiator, a circuit box or any other portion of the engine 10 and/or the generator 20).

In other embodiments, the plurality of outer beams 120 are positioned orthogonally to the corresponding inner beam 110. For example the pair of inner beams 110 can include I-beams. The plurality of outer beams 120 are positioned orthogonally (e.g., at an angle in the range of 85 to 95 degrees relative to the corresponding inner beam 110) on a sidewall of a corresponding inner beam 110 distal from a longitudinal axis of the chassis 102 so that the outer beams 120 are vertically offset from the inner beams. Each of the plurality of outer beams 120 extends orthogonally away from the corresponding inner beam 110 relative to the longitudinal axis of the chassis 102. The outer beam 120 can include I-beams, rectangular tubes or square tubes. In some embodiments, the outer beam height of the plurality of outer beams 120 can be less than the inner beam height of the plurality of inner beams 110 so that no portion of the outer beams 120 is higher than a corresponding portion of the corresponding inner beams 110.

The plurality of outer beams 120 (e.g., the pair of outer beams 120 positioned parallel to the inner beams 110 as shown in FIGS. 1A and 1B or plurality of outer beams 120 extending orthogonally from the inner beams 110) are structured to be positioned on a plurality of mounting members 140 positioned on the surface G. The plurality of mounting members 140 can include spring isolators, shock absorbers, dampers, rubber blocks, metal blocks or any other suitable mounting member 140, and can be structured to provide shock absorbing and/or vibration damping capabilities.

Because the plurality of outer beams 120 are vertically offset from the corresponding inner beams 110, a first distance H1 between the at least a pair of inner beams 110 and the surface G is less than a second distance H2 between the plurality of outer beams 120 and the surface G. In other words, the second sidewall of the pair of inner beams 110 is closer to the surface G than the first sidewall of the plurality of outer beams 120.

The pair of inner beams 110 are structured to mount at least a portion of the genset 100 thereon such that a part of the at least a portion of the genset 100 is lower than at least a portion of the plurality of outer beams 120. For example, as shown in FIGS. 1A and 1B the engine 10 can be positioned on the pair of inner beams 110 so that a part of the engine 10 is lower than at least a portion of the plurality of outer beams 120. This may lower the overall height H of the genset 100 relative to generally used chassis' that only include a pair of beams (i.e., do not include vertically offset beams) for positioning on the mounting members 140 as well as mounting the genset 100 thereon, while allowing use of standard mounting members 140 (e.g., spring isolators).

The lowering of the overall height H of the genset 100 corresponds to the vertical offset between the pair or inner beams 110 and the plurality of outer beams 120, for example 2, 4, 6, 8 or 10 inches inclusive of all ranges and value therebetween. Lowering of the overall height H of the genset 100 may facilitate available of more space when the genset 100 (e.g., a large genset having a power rating of greater than 750 kW) is positioned inside an enclosure (e.g., an ISO 6346 container). Furthermore, the lower overall height H of the genset 100 may allow the genset 100 to be positioned comfortably within standard enclosures, for example an ISO 6346 whether mounted on a mounting members 140 during operation or positioned on a floor of the enclosure (e.g., the surface G) with the at least a pair of inner beams 110 contacting the floor of the enclosure during shipping.

For example, the genset 100 can have a length in the range of 6.5-7.5 meters (e.g., 7 meters), a width in the range of 1.8-2.2 meters (e.g., 2 meters) and a height in the range of 2.3-2.7 meters (e.g., 2.5 meters) inclusive of all ranges and values therebetween. Furthermore, the enclosure can include can include a standard 40 feet dry freight container having a length of 12 meters, a width of 2.3 meters and a height of 2.4 meters, a 40 feet high cube container having a length of 12 meters, a width of 2.3 meters and a height of 2.7 meters.

In this manner, more space is available during shipping which can, for example allow genset 100 accessories (e.g., cooling system, air handling units, intake air system, controllers, etc.) to also be disposed with the genset 100 within the enclosure for shipping. Furthermore, more space is also available for accessing the genset 100 during operation, for example for service or maintenance operations. The vertical offset also increases a chassis height of the chassis 102. Since stiffness is proportional to the cube of the chassis height of the chassis 102, the increased height of the chassis 102 significantly increases the stiffness of the chassis 102 without using thicker or larger beams. Thus, the chassis 102 can have a lighter weight relative to conventional chassis' which do not include vertically offset beams, thereby reducing the overall weight of the chassis 102.

The generator 20 can be mounted on any one of the pair of inner beams 110 or the plurality of outer beams 120. In some embodiments, the generator 20 is mounted on the outer beams 120 as shown in FIGS. 1A to 1B. For example, the generator 20 can have a different height than the engine 10 so that positioning the generator 20 on the inner beam 110 would misalign the generator shaft of the generator 20 with the crankshaft of the engine 10. Mounting the generator 20 on the plurality of outer beams 120 raises the height of the generator 20 relative to the engine 10, for example allowing alignment of the generator shaft to the crankshaft. In some embodiments, mounting the generator 20 on the outer beams 120 shortens a moment arm which is formed by the operative coupling of the generator 20 to the engine 10, thereby reducing a torque or otherwise load exerted by the genset 100 on the chassis 102 further reducing twisting and increasing effective stiffness during operation.

Figure 2:
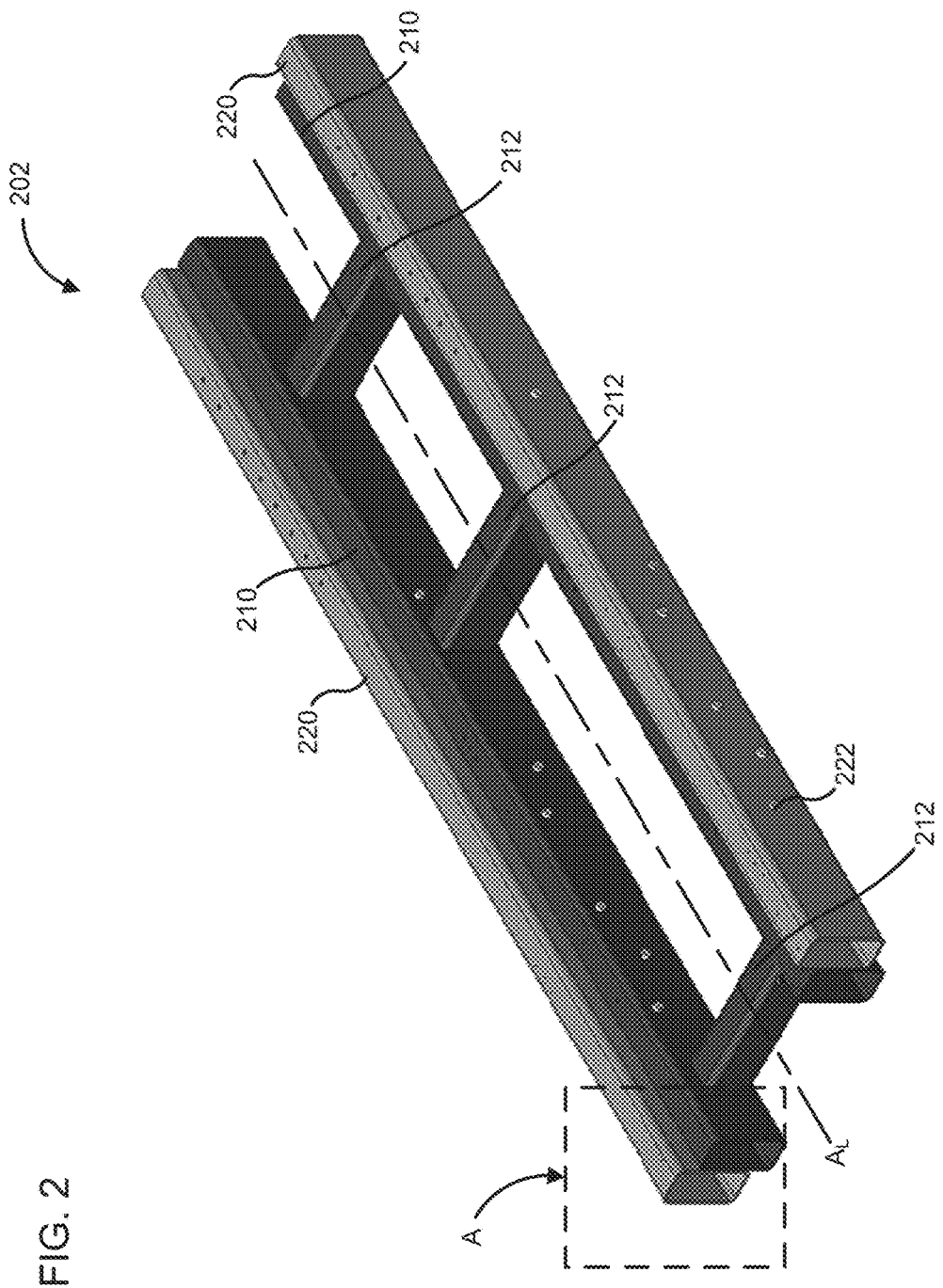
FIG. 2 is a perspective view of a chassis for mounting a genset, according to an embodiment.

FIG. 2 is a perspective view of a chassis 202 for mounting a genset (e.g., the genset 100) according to an embodiment. FIG. 3 is front view of a portion of chassis of FIG. 2. The genset can include, for example a large genset (e.g., a genset having a power rating of greater than 750 kW) and can include an engine (e.g., the engine 10) and generator (e.g., the generator 20). The chassis 202 is structured to be positioned on a surface G as shown in FIG. 3, for example the ground or a floor of an enclosure (e.g., the enclosure 250 shown in FIGS. 4A-B, or the floor of a container or brick and mortar facility) within which the genset may be positioned.

The chassis 202 includes a pair of inner beams 210 positioned parallel to each other and spaced apart by a distance. In some embodiments, the distance between the pair of inner beams 210 can correspond to a width of at least a portion of the genset to be positioned thereon (e.g., a width of at least a portion of the engine included in the genset). As shown in FIGS. 2 and 3, the pair of inner beams 210 include hollow rectangular tubes.

The pair of inner beams 210 are coupled to each other via a plurality of cross-members 212. The plurality of cross-members 212 include rectangular beams which span the distance between the pair of inner beams 210 and may include hollow or solid structural beams. In some embodiments, the cross-members 212 may include circular structural beams. The cross-members 212 extend orthogonally between the pair of inner beams 210, and are oriented perpendicular (i.e., at an angle of 90 degrees) to each of the pair of inner beams 210.

The chassis 202 also includes a pair of outer beams 220. Each outer beam 220 of each of the pair of outer beams 220 is coupled to an outer sidewall of a corresponding inner beam 210 such that the outer sidewall beings distal from a longitudinal axis $A_L$ of the chassis 202. In this manner, the outer beams 220 are positioned distal from the longitudinal axis of the chassis 202 relative to the corresponding inner beam 210.

The pair of outer beams 220 are vertically offset from the corresponding inner beam 210 such that at least a portion of the pair of outer beams 220 is higher than a corresponding portion of the pair of inner beams 210. The outer beams 220 also include rectangular hollow tubes which have the same size (i.e., the same height, width, length and thickness) as the inner tubes 210. In some embodiments, the outer beams 220 and the inner beams 210 can include 12, 14, 16, 18 or 20 inch high tubes inclusive of all ranges and values therebetween or have any other suitable height. Each of the outer beams 220 is positioned parallel to the corresponding inner beam 210 along at least a portion of the length of the corresponding inner beam 210 so that the outer beam 220 abuts the corresponding inner beam 210. While FIG. 2 shows the pair of outer beams 220 having the same length as the corresponding inner beam 210, in some embodiments, the outer beams 220 can be longer or shorter than the corresponding inner beams 210.

As described before, the outer beam 220 is positioned vertically offset from the inner beam 210 as shown in FIG. 3. A first sidewall 223 of an outer beam 220 of the plurality of outer beams 220 proximal to a surface G (e.g., ground, base of an enclosure such as a container or floor of a brick and mortar facility) on which the chassis 202 is positioned, is located higher than a second sidewall 213 of the corresponding inner beam 210 relative to the surface G when the outer beam 220 is positioned parallel to and abutting the inner beam 210. As shown in FIG. 3, the first sidewall 223 of the outer beam 220 is positioned at location which is about $\frac{1}{4}^{th}$ of the height of the inner beam 210 measured from the second sidewall 213 of the inner beam 210.

In some embodiments, the first sidewall 223 of the outer beam 220 can be located about half way of the height of the inner beam 210 measured from the second sidewall 213 of the inner beam 210. Furthermore, since the outer beam 220 has an outer beam height which is the substantially the same) as an inner beam height of the corresponding inner beam 210 (e.g., within ±% of the inner beam height), the outer beam 220 is vertically offset from the inner beam 210 and at least a portion of the outer beam 220 is higher than the corresponding portion of the corresponding inner beam 210. In various embodiments, the vertical offset between the outer beams 220 and the corresponding inner beams 210 can be 2, 4, 6, 8 or 10 inches inclusive of all ranges and values therebetween or have any other suitable offset.

As described before with respect to the chassis 102, vertically offsetting the outer beams 220 relative to the inner beams 210 can increase the bending stiffness of the structure so that the combination of the outer beam 220 and the inner beam 210 has a stiffness greater than when they are placed side-by-side. For example, each of the outer beams 220 and the inner beams 210 can include 16 inch tall beams which are coupled together and offset by a distance of 4 inches to provide an increase in the area moment of inertia by an additional amount of cross sectional area multiplied by the square of half the offset distance.

The pair of outer beams 220 and corresponding inner beams 210 can be coupled together using any suitable means. For example, the outer beam 220 can be coupled to the corresponding inner beam 210 using welds and/or a structural adhesive (e.g., polyurethanes, toughened acrylics, cyanoacrylates, epoxies, anaerobics, phenolics, vinyl acetates or any other suitable structural adhesives). The structural adhesives can provide load bearing capability and/or allow changing or otherwise tuning of the natural frequency of the chassis 202, thereby providing damping of resonant frequencies.

A plurality of pins 222 may be positioned through the pair of outer beams 220 and the corresponding inner beam 210. The pins 222 may be structured to resist shear and prevent uncoupling of the outer beams 220 from the corresponding inner beam 210. Furthermore, a first portion of the pins 222 can be vertically offset from a second portion of the pins 222, for example to provide shear resistance in different planes.

In various embodiment, the hollow outer tubes 220 and/or the inner tubes 210 can be used for storage purposes or passage of a fluid therethrough. For example, the hollow outer tubes 220 and/or the inner tubes 110 can be structured to store oil (e.g., engine oil, generator oil, gear oil, etc.) in an inner volume defined therewithin. The oil can be communicated to at least a portion of a genset mounted on the chassis 202, for example the engine or the generator as needed. Furthermore, the outer tubes 220 and/or the inner tubes 210 may also be used as oil coolers because the outer tubes 220 an the inner tubes 210 provide a large surface area for cooling the oil or any other fluid flowing therethrough or contained therewithin.

In some embodiments, the inner beams 210 and/or the outer beams 220 may be structured to allow air to flow through the inner volume thereof. For example, the outer tubes 220 and/or the inner tubes 210 may be fluidly coupled to fixed or variable speed fans (e.g., fans or air intake or exhaust) to receive air therefrom. One or more pipes (not shown) can be fluidly coupled to the inner volume defined by at least one of the inner beams 210 and/or the outer beams 220. The one or more pipes may be structured to direct the air flowing through the inner beams 210 and/or the plurality of outer beams 220 towards the genset, thereby cooling at least a portion of the genset (e.g., the genset 100).

As shown in FIG. 3, the plurality of outer beams 220 are structured to be positioned on a plurality of mounting members 240 positioned on the surface G. The plurality of mounting members 240 can include spring isolators, shock absorbers, dampers, rubber blocks, metal blocks or any other suitable mounting member 240, and can be structured to provide shock absorbing and/or vibration damping capabilities.

Because the plurality of outer beams 220 are vertically offset from the corresponding inner beams 210, the second sidewall 213 of the pair of inner beams 210 is closer to the surface G than the first sidewall 223 of the plurality of outer beams 220. The pair of inner beams 210 are structured to mount at least a portion of a genset (e.g., the genset 100) thereon such that a part of the at least a portion of the genset 200 (e.g., a part of an engine such the engine 10 included in the genset 100) is lower than at least a portion of the pair of outer beams 220.

In some embodiments, a generator of genset (e.g., the generator 20) may be mounted on the outer beams 220. In some embodiments, mounting the generator on the outer beams 220 shortens a moment arm which is formed by the operative coupling of the generator to the engine, thereby reducing a torque or otherwise load exerted by the genset on the chassis 202 during operation.

The lowering of the overall height H of the genset corresponds to the vertical offset between the pair or inner beams 210 and the plurality of outer beams 220, for example 2, 4, 6, 8 or 10 inches inclusive of all ranges and value therebetween. Lowering of the overall height H of the genset 100 causes more space to be available when the genset 100 (e.g., a large genset having a power rating of greater than 750 kW) is positioned inside an enclosure. For example, FIG. 4A is an illustration of an engine (e.g., the engine 10) and a generator (e.g., the generator 20) of a genset positioned on the chassis 202 and positioned inside an enclosure 250.

The engine is mounted on the inner beams 210 and the generator is mounted on the outer beams 220. The outer beams 220 are positioned on corresponding mounting members 240 (e.g., spring isolators) positioned on a floor F of the enclosure 250. In some embodiments, the enclosure 250 can include a container, for example ISO 6346 container. Since the engine is positioned on the inner beams 210 which are lower than the outer beams 220 mounted on the mounting members 240 and a height of the generator is significantly smaller than the height of the engine, the overall height of the genset assembly is relatively lower.

The lower overall height of the genset allows the genset to be positioned comfortably within the enclosure 250 whether mounted on a mounting members 240 during operation as shown in FIG. 4A, or positioned on a floor F of the enclosure 250 as shown in FIG. 4B with the pair of inner beams 210 contacting the floor F of the enclosure 250 during shipping. In this manner, more space is available during shipping which can, for example, allow genset accessories (e.g., cooling system, air handling units, intake air system, controllers etc.) to also be disposed with the genset in the enclosure 250. Furthermore, more space is also available for accessing the engine and/or generator during operation, for example for service or maintenance operations.

Figure 5:
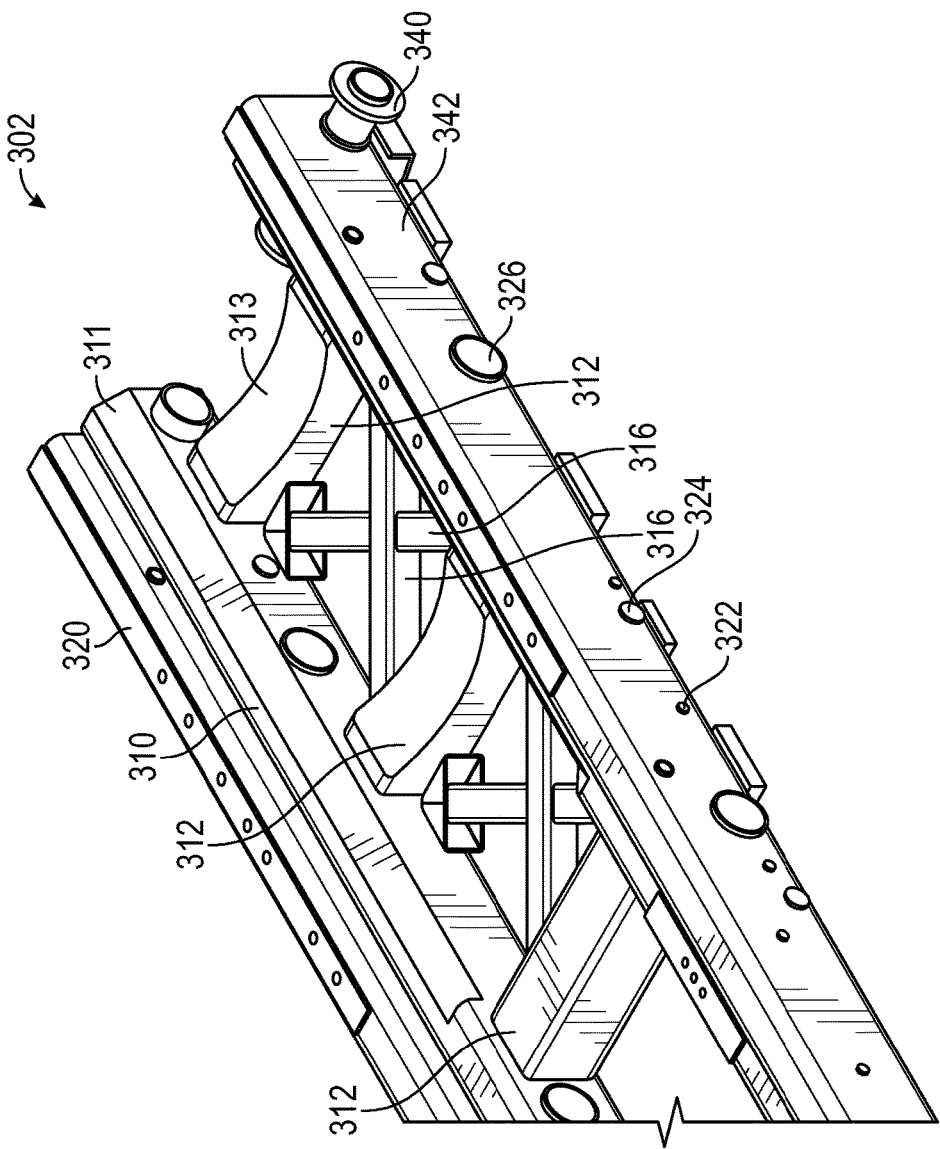
FIG. 5 is a perspective view of a portion of another embodiment of a chassis showing scalloped inner beams for accommodating a portion of a generator or an engine of a genset.

FIG. 5 is a perspective view of a portion of a chassis 302 according to an embodiment, for mounting a genset thereon, for example the genset 100 or any other genset described herein. The genset can include, for example a large genset (e.g., a genset having a power rating of greater than 750 kW) and can include an engine (e.g., the engine 10) and generator (e.g., the generator 20). The chassis 302 is structured to be positioned on a surface, for example the ground or a floor of an enclosure within which the genset may be positioned (e.g., the floor of a container or a brick and mortar facility).

The chassis 302 includes at least a pair of inner beams 310 positioned parallel to each other and spaced apart by a distance. The distance between the pair of inner beams 310 can correspond to a width of at least a portion of the genset which may be positioned on the inner beams 310, as described herein. The pair of inner beams 310 include rectangular hollow tubes. An edge 311 of the each of the pair of inner beams 310 is scalloped, for example to conform to a contour of an engine (e.g., the engine 10) positioned thereon, or conform to a contour of a portion of a generator which protrudes below the pair of outer beams 320 towards the inner beams 310 when the generator is positioned on the pair of outer beams 320.

The pair of inner beams 310 may be coupled to each other via a first set of cross-members 312 and a second set of cross-members 316. The first set of cross-members 312 and the second set of cross-members 316 include structural beams to couple the pair of inner beams 310, as well as provide mechanical stiffness and strength to mount a genset (e.g., a large genset rated at a power of greater than 750 kW) on the chassis 302. The first set of cross-members 312 extend orthogonally between the pair of inner beams 310, for example oriented perpendicular (i.e., at an angle of 90 degrees) to each of the pair of inner beams 310.

A surface 313 of the first set of cross-members 312 is scalloped or contoured, similar to the edge 311 of the inner beams 310, for example to conform to a contour of an engine (e.g., the engine 10) positioned thereon, or conform to a contour of a portion of a generator (e.g., the generator 20) which protrudes below the pair of outer beams 320 towards the inner beams 310 when the generator is positioned on the pair of outer beams 320. The second set of cross-members 316 include X-shaped members positioned at an angle in the range of 30 degrees to 75 degrees (e.g., 30, 35, 40, 45, 50, 55, 60, 65, 70, or 75 degrees inclusive of all ranges and values therebetween) with respect to each of the pair of inner beams 310. The second set of cross-members 316 may be positioned at particular locations where additional stiffness is desired, for example at a location where an engine of the genset (e.g., the engine 10 of the genset 100) is positioned.

The chassis 302 also includes a pair of outer beams 320. Each of the outer beam 320 of the pair of outer beams 320 is coupled to an outer sidewall of a corresponding inner beam 310, the outer sidewall being distal from a longitudinal axis of the chassis 302. In this manner, the outer beams 320 are positioned distal from the longitudinal axis of the chassis 302 relative to the corresponding inner beam 310. The plurality of outer beams 320 are vertically offset from the corresponding inner beam 310 such that at least a portion of the pair of outer beams 320 is higher than a corresponding portion of the pair of inner beams 310.

The outer beams 320 also include rectangular hollow tubes similar to the inner beams 310. The outer beams 320 and the inner beams 310 can be formed from the same structural beams (e.g., have the same thickness, width and height). For example, the outer beams 320 and the inner beams 310 may include 12, 14, 16, 18 or 20 inch tubes inclusive of all ranges and values therebetween or have any other suitable height. Each of the plurality of outer beams 320 may be positioned parallel to the corresponding inner beams 310 along at least a portion of the length of the corresponding inner beam 310 so that the outer beam 320 abuts the corresponding inner beam 310. The plurality of outer beams 320 can be longer, shorter or equal in length to the corresponding inner beam 310.

Furthermore, each outer beam 320 is positioned vertically offset from the corresponding inner beam 310 so that a first sidewall of each outer beam 320 proximal to a surface (e.g., ground, base of an enclosure such as a container or floor of a brick and mortar facility) on which the chassis 302 is positioned, is higher than a second sidewall of the corresponding inner beam 310 relative to the surface on which the chassis 302 is positioned, as described before herein. The outer beam 320 may also have an outer beam height which is substantially the same (e.g., within +10%) of an inner beam height of the corresponding inner beam 310.

In this manner, the outer beam 320 is vertically offset from the corresponding inner beam 310 and at least a portion of the outer beam 320 is higher than the corresponding portion of the corresponding inner beam 310. In various embodiments, the vertical offset between the outer beams 320 and the corresponding inner beam 310 can be 2, 4, 6, 8 or 10 inches inclusive of all ranges and values therebetween or have any other suitable offset. Vertically offsetting the outer beams 120 relative to the inner beams 110 can increase the bending stiffness of the structure so that the combination of the outer beam 120 and the inner beam 110 has a stiffness greater than when they are placed side-by-side. For example, each of the outer beams 120 and the inner beams 110 can include 16 inch tall beams which are coupled together and offset by a distance of 4 inches to provide an increase in the area moment of inertia by an additional amount of cross sectional area multiplied by the square of half the offset distance.

The outer beams 320 and inner beams 310 may be coupled together using any suitable means. For example, the outer beam 320 can be coupled to the corresponding inner beam 310 using welds and/or a structural adhesive (e.g., polyurethanes, toughened acrylics, cyanoacrylates, epoxies, anaerobics, phenolics, vinyl acetates or any other suitable structural adhesives). The structural adhesives can provide load bearing capability and/or changing and/or tuning the natural frequency of the chassis 302, thereby providing damping of resonant frequencies.

A plurality of pins 322 may be positioned through the plurality of outer beams 320 and the corresponding inner beam 310. FIG. 6A is a side view of a portion of the chassis 302 which includes an outer beam 320 of the pair of outer beams 320 coupled to a corresponding inner beam 310. FIG. 6B shows a side cross-section view and FIG. 6C shows a perspective view of a portion of the chassis 302 of FIG. 6A shown by the arrow B in FIG. 6A to show a portion of the pins 322.

The pins 322 are inserted through the outer beam 320 and the corresponding inner beam 310. The pins 322 may be structured to resist shear and prevent uncoupling of the outer beams 320 from the corresponding inner beam 310. Furthermore, a first portion of the pins 322 can be vertically offset from a second portion of the pins 322, for example to provide shear resistance in different planes. A second set of pins 324 may also be positioned through the outer beam 320 and the corresponding inner beam 310. The second set of pins 324 may have a larger diameter and, thereby a higher shear strength then the plurality of pins 322.

Figure 8B:
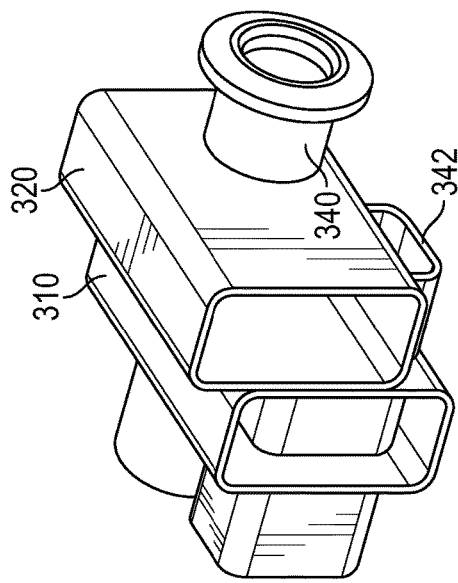
FIGS. 8A-C show a left side perspective, right side perspective and a front view of a portion of the chassis of FIG. 5 which includes a cross beam positioned through the inner beam and the outer beam of the chassis of FIG. 5.
Figure 8C:
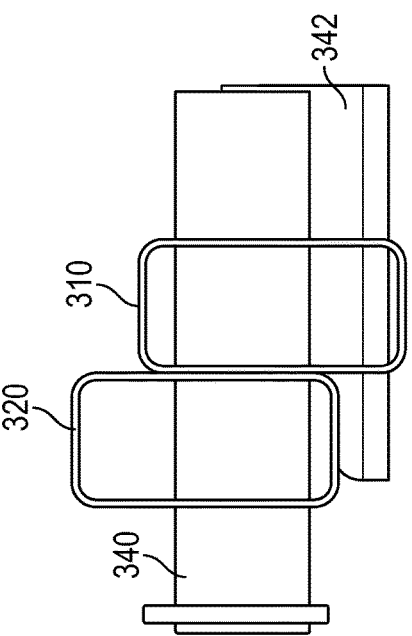
Figure 8A:
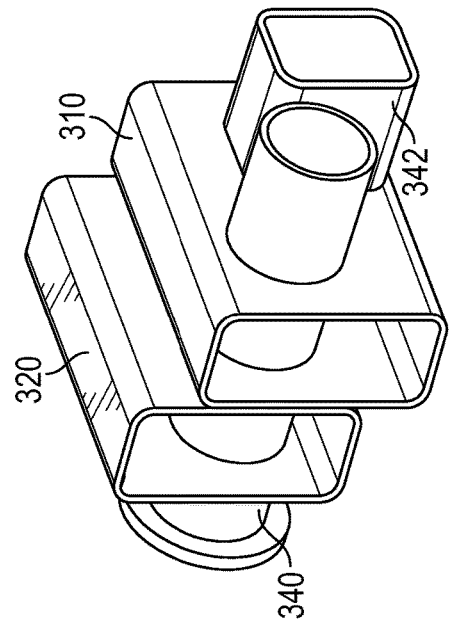

A plurality of sleeves 326 may also be positioned through the plurality of outer beams 320 and the corresponding inner beam 310. FIG. 7A is a side view of a portion of the chassis 302 which includes an outer beam 320 of the pair of outer beams 320 coupled to a corresponding inner beam 310 with a sleeve 326 positioned therethrough. FIG. 7B shows a side cross-section view and FIG. 7C shows a perspective view of a portion of the chassis 302 of FIG. 7A shown by the arrow C in FIG. 7A to show a portion of a sleeve 326 included in the plurality of sleeves 326. The plurality of sleeves 326 may include circular hollow tubes structured to allow passage of a genset component therethrough, for example, tubes (e.g., oil pipes, water or coolant tubes), electrical leads, wires, etc., as well as providing additional shear resistance At least one cross-beam may be positioned through the plurality of outer beams 320 and the corresponding inner beam 310, for example to couple the outer beam 320 to the corresponding inner beam 310 and/or provide additional structural support. FIG. 8A is a first perspective view, FIG. 8B is a second perspective view and FIG. 8C is a side view of a portion of the chassis 302 showing a first cross-beam 340 and a second cross-beam 342 positioned through an outer beam 320 of the pair of outer beams 320 and a corresponding inner beam 310.

The first cross-beam 340 may include a circular structural beam inserted through the outer beam 320 and the corresponding inner beam 310. The second cross-beam 342 includes a rectangular structural beam also inserted through the outer beam 320 and the corresponding inner beam 310. In some embodiments, any combination cross-beams can be used, for example a pair of the circular cross-beams 340, a pair of the rectangular cross-beams 342, any other suitable cross-beam or any combination thereof.

The plurality of pins 322 and 324, the plurality of sleeves 326 and/or the cross-beams 340 and 342 may be structured to resist torque, for example generated by rotation of a crankshaft of an engine (e.g., the engine 10) included in a genset (e.g., the genset 100) mounted on the chassis 302, resist cleavage or peeling of the plurality of outer beams 320 from the corresponding inner beams 310 if structural adhesive is used to bond them together and/or provide additional structural stiffness for mounting the genset thereon.

Figure 10:
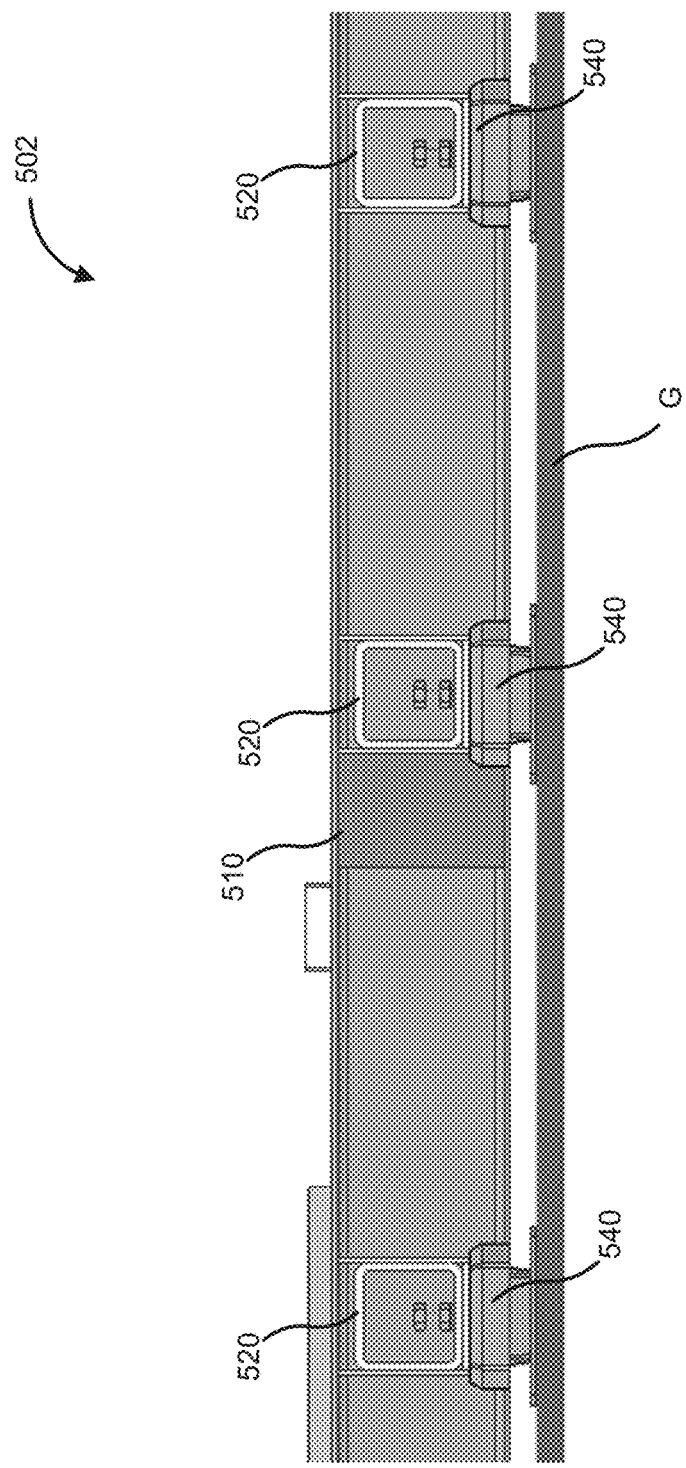
FIG. 10 is a side view of a portion of the chassis of FIG. 9.

In other embodiments, a chassis can include a plurality of outer beams positioned orthogonally to corresponding inner beams. For example, FIG. 9 is a perspective view of a chassis 502 according to an embodiments, and FIG. 10 is a side view thereof. The chassis 502 includes a pair of inner beams 510 separated by a distance. Each of the pair of inner beams 510 may include I-beams. The pair of inner beams 510 are coupled to each other via a plurality of cross-members 512 positioned orthogonally to each of the pair of inner beams 510. In some embodiments, the cross-members can include I-beams. In other embodiments, the cross-members 512 can include hollow tubes or bars having an suitable shape (e.g., rectangular, circular, square, elliptical or polygonal).

A plurality of outer beams 520 are positioned orthogonally (e.g., at an angle in the range of 85 to 95 degrees relative to the corresponding inner beam 110) on a sidewall of a corresponding inner beam 510 distal from a longitudinal axis of the chassis 502 so that the outer beams 520 are vertically offset from the corresponding inner beam 510. Each of the plurality of outer beams 520 extends orthogonally away from the corresponding inner beam 510 relative to the longitudinal axis of the chassis 502. As shown in FIGS. 9 and 10, the outer beams 520 include square or rectangular hollow tubes, but in some embodiments, the outer beams 520 can also include I-beams.

The plurality of outer beams 520 can be coupled to the corresponding inner beam 510 using any welding, screws, bolts, rivets or any other suitable coupling mechanism. The plurality of outer beams 520 are positioned vertically offset from the corresponding inner beams 510. However, an outer beam height of the plurality of outer beams 520 is less than the inner beam height of the pair of inner beams 510 so that no portion of the outer beams 520 is higher than a corresponding portion of the corresponding inner beams 510. In other embodiments, the plurality of outer beams 520 can have an outer beam height so that at least a portion of the plurality of outer beams 520 is higher than the corresponding inner beam 510.

The plurality of outer beams 520 are structured to be positioned on a plurality of mounting members 540 (e.g., spring isolators, shock absorbers, dampers, rubber blocks, metal blocks or any other suitable mounting member) positioned on a surface G, as shown in FIG. 10. The plurality of mounting members 540 may be structured to provide shock absorbing and/or vibration damping capabilities. Because the plurality of outer beams 520 are vertically offset from the corresponding inner beams 110, a first distance between the pair of inner beams 510 and the surface G is less than a second distance between the plurality of outer beams 520 and the surface G. In other words, the pair of inner beams 510 are closer to the ground than the plurality of outer beams 120. This lowers the overall clearance of the chassis 502 and the genset (e.g., the genset 100) mounted thereon from the ground G, thereby lowering the overall height of the genset.

While the chassis 102/202/302/502 are described herein as structured for mounting a genset including an engine and a generator thereon, in some embodiments the chassis 102/202/302/502 or any other chassis described herein may be used for mounting only an engine (e.g., the engine 10) thereon. For example, large engines (e.g., large diesel engines, gasoline engines, natural gas engines, bio-diesel engines, dual fuel engines, etc.) are often used to provide mechanical power for various equipment, for example marine vessels, trains, excavators or other industrial equipment. Such large engines may have a high horse power (e.g., 2,500 horsepower or more. In some embodiments, the large engines may have a length in the range of 3 to 5 meters, a width in the range of 1.8 to 2.2 meters and a height in the range of 2 to 2.4 meters inclusive of all ranges and values therebetween.

In such embodiments, the large engine may be mounted on the chassis 102/202/302/502 or any other chassis described herein, for example mounted on the pair of inner beams 110/210/310/510 of the chassis 102/202/302/502. Mounting the large engine on the inner beams 102/202/302/502 may lower the overall height of the assembly that includes the large engine and the chassis 102/202/302/502, lower the center of gravity of the large engine and/or provides increased stiffness due to higher overall height of the chassis 102/202/302/502 resulting from the vertically offset inner beams 110/210/310/510 and outer beams 120/220/320/520, as described before herein.

The large engine can be mounted on the chassis 102/202/302/502 during shipping with the inner beams 110/210/310/510 positioned on a floor of an enclosure (e.g., and ISO 6346 container) used for shipping the engine. During operating, the outer beams 120/220/320/520 of the chassis 102/202/302/502 may be mounted on mounting members 140/240/540 (e.g., spring isolators, shock absorbers, dampers, rubber blocks, metal blocks or any other suitable mounting member) and the large engine positioned on the inner beams 110/210/310/510 so that an overall height of the large engine is reduced, as described herein.

Figure 11:
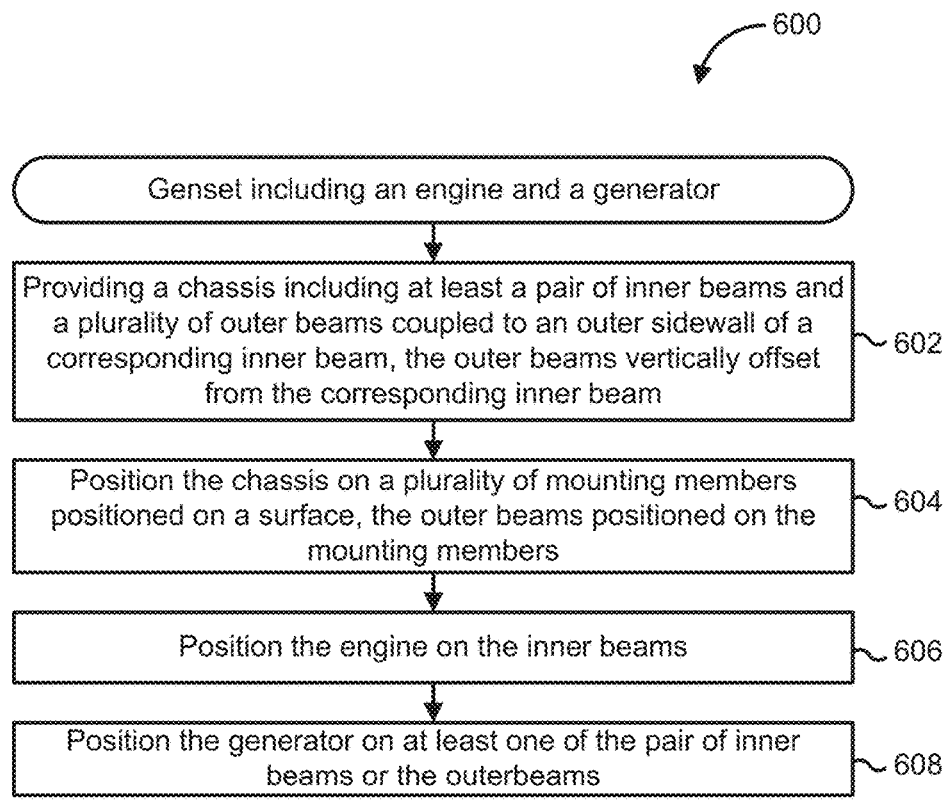
FIG. 11 is a schematic flow diagram of an embodiment of a method of mounting a genset on a chassis.

FIG. 11 is a schematic flow diagram of an example method 600 for mounting a genset (e.g., the genset 100) which includes an engine (e.g., the engine 10) and a generator (e.g., a generator 20) on a chassis so that an overall height of the genset is reduced. The method 600 includes providing a chassis including a pair of inner beams coupled to a corresponding outer beam vertically offset thereto, at 602. For example, the chassis 102/202/302/502 includes at least a pair of inner beams 110/210/310/510 positioned parallel to each other and spaced apart by a distance.

The chassis 102/202/302/502 also includes a plurality of outer beams 120/220/320/520 so that an outer beam 120/220/320/520 of each of the plurality of outer beams 120/220/320/520 is coupled to an outer sidewall of a corresponding inner beam 110/210/310/510 of the pair of inner beams 110/210/310/510. The outer sidewall distal is from a longitudinal axis of the genset chassis 102/202/302/502. Moreover, the plurality of outer beams 120/220/320/520 are vertically offset from the corresponding inner beam 110/210/310/510 such that at least a portion of the plurality of outer beams 120/220/320/520 is higher than a corresponding portion of the at least a pair of inner beams 110/210/310/510, as described before herein.

The chassis is positioned on a plurality of mounting members positioned on a surface (e.g., the surface G of the floor F of the container 250) such that the plurality of outer beams are positioned on the mounting members at 604. For example, the outer members of the chassis 102/202/302/502 are positioned on the mounting members 140/240/340/540, which may include, for example spring isolators, vibration dampers, shock absorbers, etc. The mounting members are positioned on a surface, for example a base of an enclosure (e.g., a container such as an ISO 6346 container) 140/240/340/540 such that a first distance between the at least a pair of inner beams 110/210/310/510 and the surface is less than a second distance between the plurality of outer beams 120/220/320/520 and the surface.

An outer beam of the plurality of outer beams 120/220/320/520 may be coupled to a corresponding inner beam 110/210/310/510 via a welding or structural adhesives, as described herein. In some embodiments, a plurality of pins (e.g., the pins 222/322/522) may be inserted through the plurality of outer beams 110/210/310/510 and the corresponding inner beam 120/220/320/520. The pins may be structured to resist shear and prevent uncoupling of the plurality of outer beams 120/220/320/520 from the corresponding inner beam 110/210/310/510.

In some embodiments, a plurality of sleeves (e.g., the sleeve 326) may be inserted through the plurality of outer beams 120/220/320/520 and the corresponding inner beam 110/210/310/510. The sleeves may be structured to allow passage of a genset component therethrough. For example, the plurality of sleeves can be used for passing genset components such as, for example tubes (e.g., oil pipes, water or coolant tubes), electrical leads, wires, etc. therethrough to the engine and/or the generator positioned on the chassis, as described herein.

The engine is positioned on the at least a pair of inner beams at 606, such that a part of the engine is lower than the at least a portion of the plurality of outer beams. For example, the engine 10 or any other engine described herein is positioned on the at least a pair of inner beams 110/210/310/510 so that at least a part of engine 10 or any other engine described herein is lower than the outer beams 120/220/320/520.

The generator is positioned on the at least a pair of inner beams or the plurality of outer beams at 608. For example, the generator 20 or any other generator described herein may be positioned on the inner beams 110/210/310/510 or the outer beams 120/220/320/520. In some embodiments, the generator may be mounted on the outer beams so that the moment arm formed between the engine and the generator is reduced. This may lead to a lower torque being exerted on the chassis 102/202/302/502.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. A genset chassis for mounting a genset including an engine and generator thereon, comprising:
    a pair of inner beams positioned parallel to each other and spaced apart by a distance, each inner beam including an outer sidewall distal from a longitudinal axis of the genset chassis; and
    a plurality of outer beams, each outer beam coupled to the outer sidewall of a corresponding inner beam so that an engine mounting surface of each inner beam is inset toward the longitudinal axis of the genset chassis relative to a corresponding outer beam, and each outer beam vertically offset from a corresponding inner beam such that at least a portion of each the plurality of outer beams is higher than the pair of inner beams,
    wherein the plurality of outer beams is structured to be positioned on a plurality of mounting members positioned on a surface so that a first distance between the pair of inner beams and the surface is less than a second distance between the plurality of outer beams and the surface, and
    wherein the inner beams are structured to mount a portion of the genset thereon such that a portion of the genset is lower than a portion of the plurality of outer beams.

2. The genset chassis of claim 1, wherein the inner beams are coupled to each other via at least one cross-member.

3. The genset chassis of claim 1, wherein each outer beam is positioned parallel to the corresponding inner beam along a portion of the length of the corresponding inner beam.

4. The genset chassis of claim 3, wherein each of the inner beams and each of outer beams includes hollow tubes.

5. The genset chassis of claim 3, wherein each outer beam is coupled to the corresponding inner beam via structural adhesive.

6. The genset chassis of claim 3, further comprising:
    a plurality of pins, each pin positioned through each outer beam and the corresponding inner beam, the pins structured to resist shear and prevent uncoupling of each outer beam from the corresponding inner beam.

7. The genset chassis of claim 3, further comprising:
a plurality of sleeves, each sleeve positioned through each of the outer beams and the corresponding inner beams, the plurality of sleeves structured to allow passage of a genset component therethrough.

8. The genset chassis of claim 3, further comprising:
at least one cross beam positioned through each outer beam and the corresponding inner beam.

9. The genset chassis of claim 1, wherein each outer beam is positioned orthogonally to the corresponding inner beam.

10. The genset chassis of claim 9, wherein the inner beams include I-beams.

11. A genset mounting assembly for mounting a genset including an engine and a generator, comprising:
a genset chassis defining a longitudinal axis comprising:
   a pair of inner beams positioned parallel to each other and spaced apart by a distance, each inner beam including an outer sidewall distal from the longitudinal axis of the genset chassis, and
   a plurality of outer beams, each outer beam coupled to the outer sidewall of a corresponding inner beam so that an engine mounting surface of each inner beam is inset toward the longitudinal axis of the genset chassis relative to a corresponding outer beam, each outer beam vertically offset from the corresponding inner beam such that a portion of each of the outer beams is higher than the inner beams; and
a plurality of mounting members structured to be positioned on a surface, the plurality of outer beams positioned on the plurality of mounting members so that a first distance between the inner beams and the surface is less than a second distance between the outer beams and the surface,
wherein the inner beams are structured to mount a portion of the genset thereon such that a portion of the genset is lower than a portion of each of the outer beams.

12. The genset mounting assembly of claim 11, wherein the outer beams are structured to mount the generator thereon.

13. The genset mounting assembly of claim 11, wherein a portion of each of the inner beams is scalloped.

14. The genset mounting assembly of claim 11, wherein each outer beam is positioned parallel to the corresponding inner beam along at least a portion of the length of the corresponding inner beam.

15. The genset mounting assembly of claim 11, wherein each of the inner beams and each of the outer beams includes hollow tubes defining an inner volume.

16. The genset mounting assembly of claim 15, wherein at least one of the inner beams and the outer beams is structured to store an oil in the inner volume for communicating to the engine or the generator.

17. The genset mounting assembly of claim 15, wherein at least one of the inner beams and the outer beams is structured to allow air to flow through the inner volume.

18. The genset mounting assembly of claim 17, further comprising:
a pipe fluidly coupled to the inner volume defined by at least one of the inner beams and the outer beams, the pipe structured to direct the air flowing through the at least one of the inner beams and the outer beams towards the genset, thereby cooling a portion of the genset.

19. The genset mounting assembly of claim 11, wherein each outer beam is coupled to the corresponding inner beam via a structural adhesive.

20. The genset mounting assembly of claim 11, further comprising:
a plurality of pins, each pin positioned through each of the outer beams and the corresponding inner beams, the pins structured to resist shear and prevent uncoupling of the outer beam from the corresponding inner beam.

21. The genset mounting assembly of claim 11, further comprising:
a plurality of sleeves, each sleeve positioned through each of the outer beams and the corresponding inner beams, the plurality of sleeves structured to allow passage of a genset component therethrough.

22. The genset mounting assembly of claim 11, further comprising:
at least one cross beam positioned through each of the outer beams and the corresponding inner beams.

23. A method of mounting a genset on a surface, the genset including an engine and a generator, the method comprising:
providing a chassis including a pair of inner beams positioned parallel to each other and spaced apart by a distance, each inner beam including an outer sidewall distal from a longitudinal axis of the genset chassis, and a plurality of outer beams, each outer beam coupled to the outer sidewall of a corresponding inner beam, each outer beam vertically offset from the corresponding inner beam such that a portion of each outer beam is higher than the corresponding inner beam;
positioning the chassis on a plurality of mounting members positioned on a surface such that outer beams are positioned on the mounting members;
positioning the engine on the at least a pair of inner beams such that a part of the engine is lower than a portion of the outer beams; and
positioning the generator on the inner beams or the outer beams,
wherein a first distance between the inner beams and the surface is less than a second distance between the outer beams and the surface.

24. The method of claim 23, further comprising:
inserting each of a plurality of pins through of each of the outer beams and the corresponding inner beams, the pins structured to resist shear and prevent uncoupling of the outer beams from the corresponding inner beams.

25. The method of claim 23, further comprising:
inserting a plurality of sleeves through the plurality of outer beams and the corresponding inner beams, the sleeves structured to allow passage of a genset component therethrough.

26. The method of claim 23, further comprising:
inserting at least one cross beam through each of the outer beams and the corresponding inner beams.

* * * * *